UNITED STATES PATENT OFFICE.

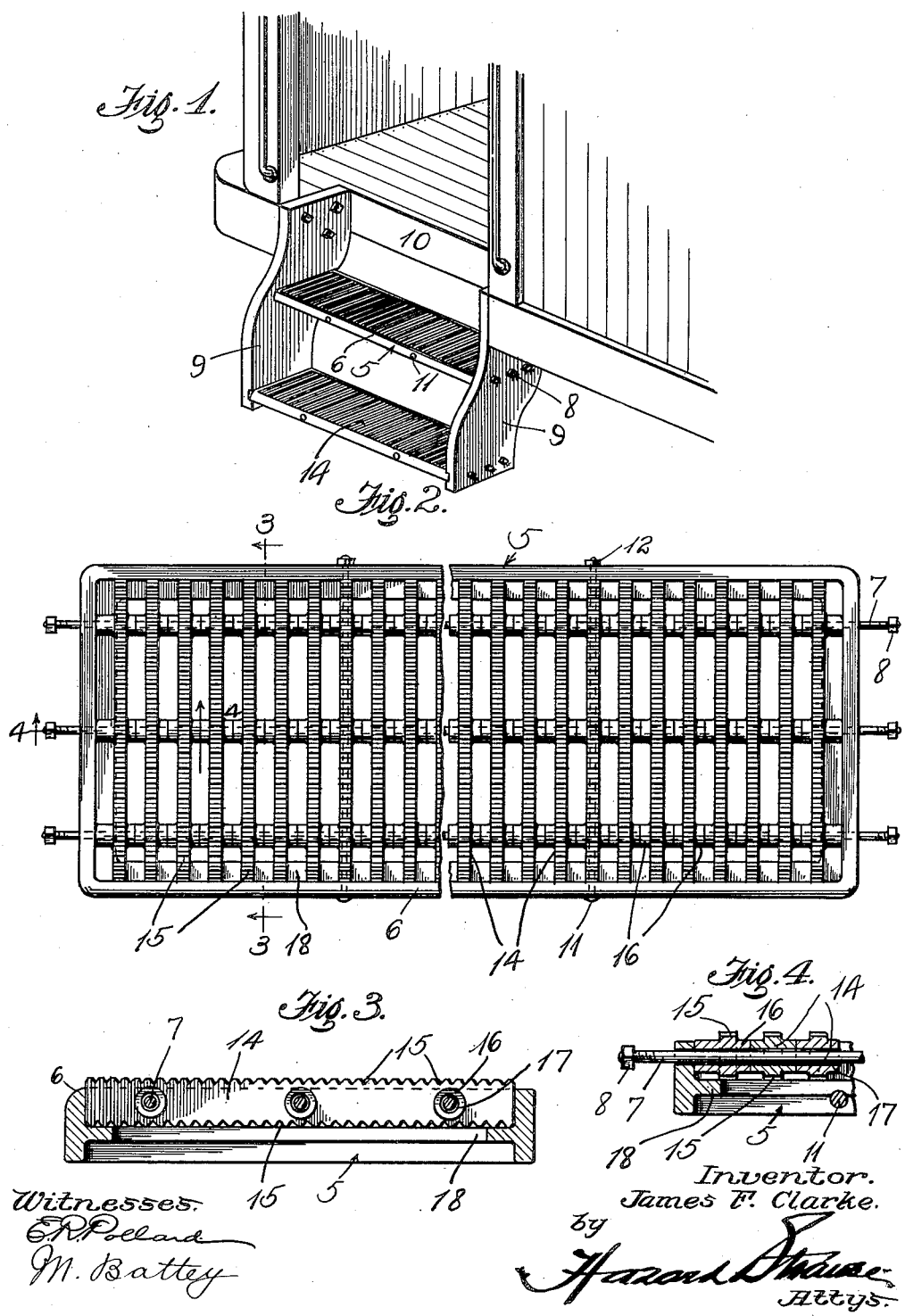

JAMES FRANCIS CLARKE, OF LOS ANGELES, CALIFORNIA.

VEHICLE-STEP.

1,134,032.  Specification of Letters Patent.  Patented Mar. 30, 1915.

Application filed November 16, 1914. Serial No. 872,357.

*To all whom it may concern:*

Be it known that I, JAMES FRANCIS CLARKE, a citizen of the United States, residing at Los Angeles, in the county of Los Angeles, State of California, have invented new and useful Improvements in Vehicle-Steps, of which the following is a specification.

This invention relates to vehicle steps, and particularly pertains to steps especially adapted for use on street cars.

It is the object of this invention to provide a car step having an apertured and serrated tread surface, and which is built up of a plurality of removable reversible and interchangeable members.

Another object is to provide a means for supporting and connecting the tread members whereby they may be readily removed and reversed or removed.

The invention is illustrated in the accompanying drawing, in which:

Figure 1 is a perspective view of a car platform showing the improved step applied thereto. Fig. 2 is a plan view of the invention with parts broken away. Fig. 3 is a detail cross section on the line 3—3 of Fig. 2 as seen in the direction indicated by the arrows. Fig. 4 is a cross section on the line 4—4 of Fig. 2 as seen in the direction indicated by the arrows.

More specifically, 5 designates the car step frame which is here shown as formed of T iron bent in the shape of a rectangular frame with the flange interiorly disposed; the front rail portion of the frame being preferably rounded on its upper edge as indicated at 6. The ends of the frame are formed with perforations arranged with the perforations on one end disposed opposite the perforations on the opposite end and above the inwardly extending flange of the frame. These perforations are designed to receive rods 7 having threaded outer ends for the reception of nuts 8; the ends of the rods 7 extending a sufficient distance beyond the end members of the frame to engage and be seated in the step supporting brackets 9, mounted on the car frame 10 in the usual manner.

To brace the frame 5 transversely a plurality of bolts 11 connect the side members of the frame at suitable points intermediate its ends which bolts are arranged beneath the inturned flange portion of the frame as particularly shown in Fig. 4 and are held in place by means of nuts 12. The frame 5 is designed to receive a plurality of tread members 14 which are preferably formed of cast iron and of such length as to extend between the side rails of the frame as particularly shown in Fig. 3. The tread members are serrated or notched as indicated at 15 on their upper and lower edges to provide a secure footing; the members 14 being designed to be inverted when the serrated upper face becomes excessively worn.

The tread members 14 are designed to be spaced apart a distance slightly greater than their thickness and are provided with spacing hubs 16 on their opposite sides. The hubs 16 are designed to abut against the corresponding hubs on the adjacent tread members and are arranged in alinement with the perforations in the end members of the frame 5; the hub 16 being formed with bores 17 arranged in alinement so as to receive the rods 7 which rods serve to hold the tread members in place.

In assembling the step the tread members 14 are placed in position with their ends resting on the flange 18 of the frame 5 as particularly shown in Fig. 3, and with the apertures or bores 17 in the hubs 16 arranged in alinement with each other and in register with the apertures in the end rails of the frame 5. The frame 5 is then placed in position on the brackets 9, whereupon the bolts or rods 7 are passed through perforations in the brackets 9, thence through the end members of the frame 5 and through the bores 17 in the hubs 16 and positioned with the ends of the bolts 7 projecting through the brackets 9. The nuts 8 are then screwed into place, thereby securing the frames 5 in position on the brackets 9 and locking the tread members 14 against displacement.

What I claim is:

1. A car step, comprising a frame having a plurality of oppositely disposed bolt receiving openings, bolts passing through said openings and extending longitudinally across said frame, and a series of removable tread members supported on said frame having apertured hubs engaged by said bolts.

2. In a car step, a flanged rectangular frame, a plurality of tread members formed with upper and lower serrated edges having apertured hubs on the opposite sides thereof, and bolts passing through said apertured hubs and through the end members of the frame to secure the tread members and the frame together.

3. In a car step, a rectangular frame, a plurality of tread members formed with serrated upper and lower edges, spacing hubs formed on opposite sides of the tread members having apertures therein, and bolts passing through said apertured hubs and through the end members of the frame to secure the tread members and the frame together.

In witness that I claim the foregoing I have hereunto subscribed my name this 16th day of October, 1914.

JAMES FRANCIS CLARKE.

Witnesses:
MARGUERITE BATES,
MARIE BATTEY.